(12) United States Patent
Yoshimochi et al.

(10) Patent No.: US 8,924,451 B2
(45) Date of Patent: Dec. 30, 2014

(54) RECEPTION APPARATUS, RECEPTION METHOD AND PROGRAM FOR SINGLE CARRIER AND MULTICARRIERS DATA

(75) Inventors: Naoki Yoshimochi, Kanagawa (JP); Katsumi Takaoka, Chiba (JP); Hidetoshi Kawauchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 592 days.

(21) Appl. No.: 13/242,754

(22) Filed: Sep. 23, 2011

(65) Prior Publication Data

US 2012/0102082 A1 Apr. 26, 2012

(30) Foreign Application Priority Data

Oct. 20, 2010 (JP) ................................ 2010-235386

(51) Int. Cl.
  *G06F 17/10* (2006.01)
  *H04L 25/06* (2006.01)
  *H04L 25/03* (2006.01)
  *H04L 27/00* (2006.01)
  *H04L 25/02* (2006.01)

(52) U.S. Cl.
  CPC ........ *H04L 25/061* (2013.01); *H04L 25/03057* (2013.01); *H04L 27/0008* (2013.01); *H04L 25/0224* (2013.01); *H04L 2025/03414* (2013.01); *H04L 2025/03535* (2013.01); *H04L 2025/03636* (2013.01)
  USPC .......................................... 708/323; 708/300

(58) Field of Classification Search
  None
  See application file for complete search history.

(56) References Cited

U.S. PATENT DOCUMENTS 8,484,272 B2 * 7/2013 Gore et al. ..................... 708/400
2011/0099453 A1 4/2011 Shinya et al.

OTHER PUBLICATIONS

U.S. Appl. No. 13/235,917, filed Sep. 19, 2011, Ikegaya, et al.
U.S. Appl. No. 13/235,816, filed Sep. 19, 2011, Yoshimochi, et al.
U.S. Appl. No. 13/235,864, filed Sep. 19, 2011, Yoshimochi, et al.
U.S. Appl. No. 13/236,005, filed Sep. 19, 2011, Kawauchi, et al.

* cited by examiner

*Primary Examiner* — Michael D Yaary
(74) *Attorney, Agent, or Firm* — Oblon, Spivak, McClelland, Maier & Neustadt, L.L.P.

(57) ABSTRACT

Disclosed herein is a reception apparatus, including a first equalization section, a second equalization section, and an arithmetic operation section. The first equalization section is adapted to carry out equalization of a signal which represents data transmitted by a transmission method which uses a single carrier. The second equalization section is adapted to carry out equalization of a signal which represents data transmitted by a transmission method which uses multi carriers. The arithmetic operation section is adapted to carry out arithmetic operation for determining information to be used for the equalization by the first equalization section and arithmetic operation for determining information to be used for the equalization by the second equalization section.

9 Claims, 11 Drawing Sheets

N_FBE, the output signal OD1(t) of the FBE 14 is represented by the following expression (2):

RECEPTION APPARATUS, RECEPTION METHOD AND PROGRAM FOR SINGLE CARRIER AND MULTICARRIERS DATA

BACKGROUND

The present disclosure relates to a reception apparatus, a reception method and a program, and particularly to a reception apparatus, a reception method and a program which are ready for both of data transmission for which a single carrier is used and data transmission for which multi carriers are used.

The DTMB (Digital Terrestrial Multimedia Broadcast) standard is known as a standard for terrestrial digital broadcasting. In the DTMB standard, one of a modulation method for which a single carrier is used and another modulation method for which multi carriers are used can be selected as a modulation method for data.

In the following description, data transmission by the modulation method for which a single carrier is used is suitably referred to as single carrier transmission, and data transmission by the modulation method for which multi carriers are used is suitably referred to as multicarrier transmission.

Upon single carrier transmission, data transmission in compliance with the DTMB standard is carried out such that a PN signal and a data signal are transmitted periodically. On the other hand, upon multicarrier transmission, data transmission is carried out such that data obtained by carrying out IFFT (Inverse Fast Fourier Transform) arithmetic operation for a PN signal and a data signal are transmitted periodically. The PN signal is a known signal configured from a predetermined data string and is inserted as a guard interval for preventing interference between data signals.

A reception apparatus which is ready for the DTMB standard includes an equalizer for receiving data transmitted by single carrier transmission and another equalizer for receiving data transmitted by multicarrier transmission.

Configuration of the Single Carrier Equalizer

Figure 1:
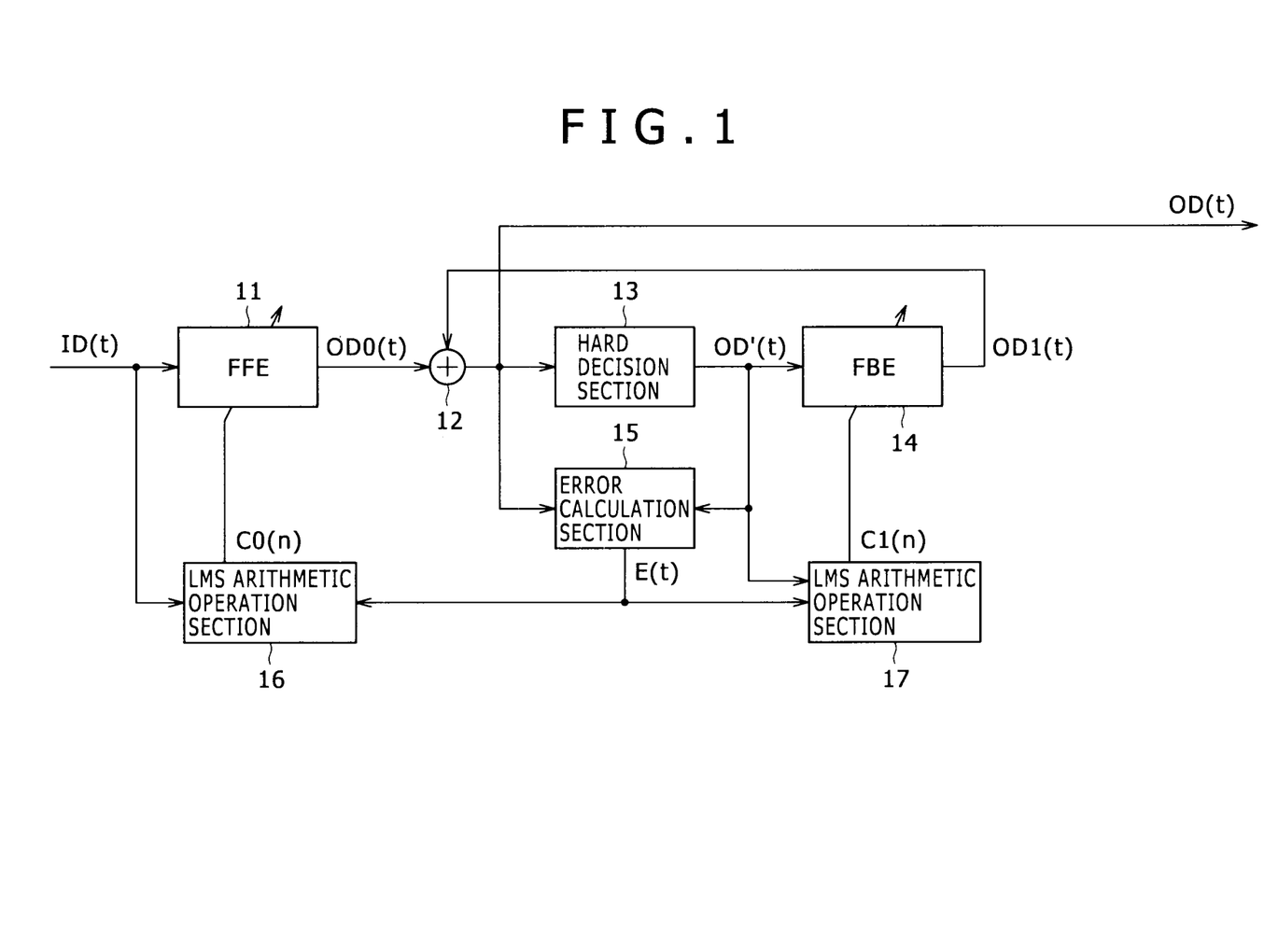
FIG. 1 is a block diagram showing a configuration of a single carrier equalizer.

FIG. 1 shows a configuration of a single carrier equalizer for receiving data transmitted by single carrier transmission.

Referring to FIG. 1, a circuit at a stage preceding to the single carrier equalizer carries out frequency conversion of a reception signal and carries out such processes as A/D (Analog/Digital) conversion, orthogonal demodulation and so forth for an IF signal obtained by the frequency conversion. An input signal ID(t) obtained by such various processes by the preceding stage circuit is inputted to a feedforward equalizer (FFE 11 and a least mean square (LMS) arithmetic operation section 16. In the single carrier equalizer, the FFE 11 and a feedback equalizer (Feed Back Equalizer: FBE) 14 are used to carry out equalization for a signal in the time domain.

The FFE 11 includes a variable coefficient filter and uses a coefficient C0($n$) determined by the LMS arithmetic operation section 16 to carry out convolution arithmetic operation between the input signal ID(t) and the coefficient C0($n$). The FFE 11 outputs a signal OD0($t$) representative of a result of the convolution arithmetic operation to an addition section 12. If the tap number of the FFE 11 is represented by N_FFE, then the output signal OD0($t$) of the FFE 11 is represented by the following expression (1):

$$OD0(t) = \sum_{i=0}^{N\_FFE-1} ID(t-i) \times C0(i) \quad (1)$$

The addition section 12 adds the output signal OD0($t$) of the FFE 11 and an output signal OD1($t$) of the FBE 14 to produce an equalized signal OD(t) (OD(t)=OD0($t$) and OD1($t$)) and outputs the equalized signal OD(t). The equalized signal OD(t) outputted from the addition section 12 is outputted to the outside of the single carrier equalizer and is supplied also to a hard decision section 13 and an error calculation section 15.

The hard decision section 13 carries out a hard decision of the equalized signal OD(t) supplied thereto from the addition section 12 and outputs a signal OD'(t) representative of a result of the hard decision. The signal OD'(t) is supplied to the FBE 14, the error calculation section 15 and a LMS arithmetic operation section 17.

Also the FBE 14 is formed from a variable coefficient filter and uses a coefficient C1($n$) determined by the LMS arithmetic operation section 17 to carry out convolution arithmetic operation of the signal OD'(t) supplied thereto from the hard decision section 13 and the coefficient C1($n$). The FBE 14 outputs a signal OD1($t$) representative of a result of the convolution arithmetic operation. The output signal OD1($t$) is supplied to the addition section 12, by which it is used for addition to the output signal OD0($t$). Where the tap number of the FBE 14 is represented by N_FBE, the output signal OD1($t$) of the FBE 14 is represented by the following expression (2):

$$OD1(t) = \sum_{i=0}^{N\_FBE-1} 0D'(t-\alpha-i) \times C1(i) \quad (2)$$

where $\alpha$ is delay time from the equalized signal OD(t) to the signal OD'(t).

The error calculation section 15 subtracts the signal OD'(t) representative of a hard decision result supplied thereto from the hard decision section 13 from the equalized signal OD(t) supplied thereto from the addition section 12 and outputs an error signal E(t) (E(t)=OD(t)−OD'(t)). The error signal E(t) outputted from the error calculation section 15 is supplied to the LMS arithmetic operation section 16 and the LMS arithmetic operation section 17.

The LMS arithmetic operation section 16 carries out LMS arithmetic operation based on the input signal ID(t) and the error signal E(t) supplied thereto from the error calculation section 15 and updates the coefficient C0($n$) of the FFE 11.

The LMS arithmetic operation section 17 carries out LMS arithmetic operation based on the signal OD'(t) supplied thereto from the hard decision section 13 and representative of a hard decision result and the error signal E(t) supplied thereto from the error calculation section 15 and updates the coefficient C1($n$) of the FBE 14.

In this manner, the single carrier equalizer carries out hard decision arithmetic operation which is arithmetic operation for equalization of the input signal ID(t), arithmetic operation of an error signal and arithmetic operation for updating of the coefficients of the variable coefficient filters, that is, the FFE 11 and the FBE 14, using signals in the time domain. It is to be noted that "(t)" represents that the pertaining signal is a signal in the time domain.

Configuration of the Multicarrier Equalizer

Figure 2:
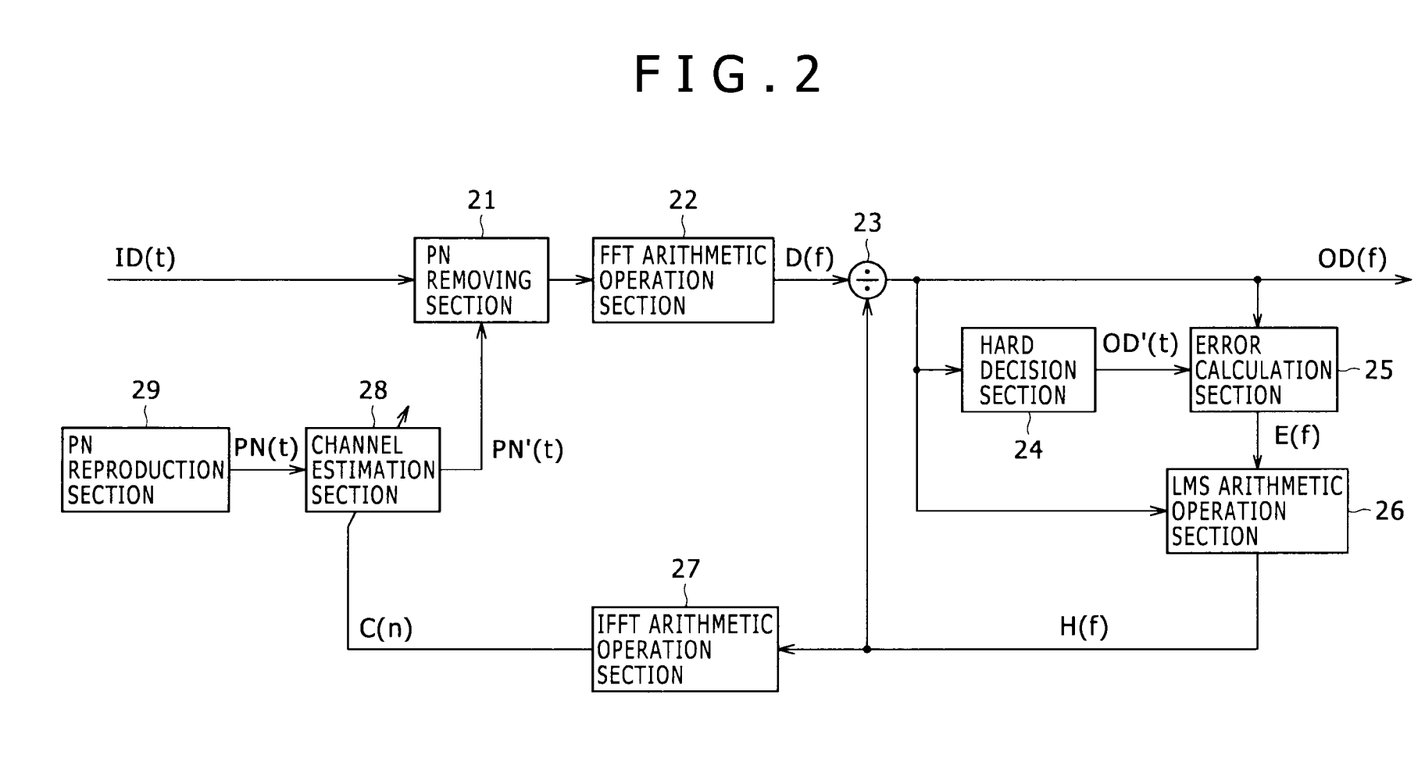
FIG. 2 is a block diagram showing a configuration of a multicarrier equalizer.

FIG. 2 shows a configuration of a multicarrier equalizer for receiving data transmitted by multicarrier transmission. Referring to FIG. 2, an input signal ID(t) is inputted to a PN removing section 21.

The PN removing section 21 subtracts an estimation value PN'(t) of a PN signal supplied thereto from a channel estimation section 28 from the input signal ID(t) to remove the PN signal from the input signal ID(t) and outputs a data signal (ID(t)−PN'(t)) to a FFT (Fast Fourier Transform) arithmetic operation section 22.

The FFT arithmetic operation section 22 carries out FFT arithmetic operation for the data signal supplied thereto from the PN removing section 21 and outputs a data signal D(f) to a division section 23. Since the data signal transmitted by multicarrier transmission has been subjected to IFFT (Inverse Fast Fourier Transform) arithmetic operation by the apparatus on the transmission side, the multicarrier equalizer carries out FFT arithmetic operation for the data signal. The data signal D(f) is a signal in the frequency domain.

A division section 23 divides the data signal D(f) supplied thereto from the FFT arithmetic operation section 22 by a channel estimation value H(f) supplied thereto from a LMS arithmetic operation section 26 to produce an equalized signal OD(f) and outputs the equalized signal OD(f). The equalized signal OD(f) outputted from the division section 23 is outputted to the outside and supplied also to a hard decision section 24 and the LMS arithmetic operation section 26.

The hard decision section 24 carries out a hard decision of the equalized signal OD(f) and outputs a signal OD'(f) representative of a result of the hard decision to an error calculation section 25.

The error calculation section 25 subtracts the signal OD'(f) supplied thereto from the hard decision section 24 from the equalized signal OD(f) and outputs an error signal E(f) (E(f)= OD(f)−OD'(f)) to the LMS arithmetic operation section 26.

The LMS arithmetic operation section 26 carries out LMS arithmetic operation based on the equalized signal OD(f) supplied thereto from the division section 23 and the error signal E(f) supplied thereto from the error calculation section 25 to determine a channel estimation value H(f) in the frequency domain. The channel estimation value H(f) determined by the LMS arithmetic operation section 26 is supplied to the division section 23, by which it is used for equalization of the data signal D(f). The channel estimation value H(f) is supplied also to an IFFT arithmetic operation section 27.

The IFFT arithmetic operation section 27 carries out IFFT arithmetic operation for the channel estimation value H(f) supplied thereto from the LMS arithmetic operation section 26 and outputs a channel estimation value C(n) in the time domain to the channel estimation section 28.

The channel estimation section 28 is formed from a variable coefficient filter and uses the channel estimation value C(n) supplied thereto from the IFFT arithmetic operation section 27 as a coefficient to carry out convolution arithmetic operation of a PN signal PN(t) reproduced by a PN reproduction section 29 and the channel estimation value C(n). The channel estimation section 28 outputs an estimation value PN'(t) determined by the convolution arithmetic operation to the PN removing section 21. If the PN signal reproduced by the PN reproduction section 29 is represented by PN(t) and the tap number of the filter which configures the channel estimation section 28 by N_CHE, then the estimation value PN'(t) of the PN signal is represented by the following expression (3):

$$PN'(t) = \sum_{i=0}^{N\_CHE-1} PN(t-i) \times C(i) \quad (3)$$

The PN reproduction section 29 reproduces the PN signal PN(t) and outputs the reproduced PN signal PN(t) to the channel estimation section 28.

In this manner, the multicarrier equalizer carries out hard decision arithmetic operation which is arithmetic operation for equalization of the input signal ID(t), arithmetic operation of an error signal and arithmetic operation for updating coefficients of the variable coefficient filter, that is, the channel estimation section 28, using signals in the frequency domain. It is to be noted that "(f)" indicates that the pertaining signal is a signal in the frequency domain.

The following Non-Patent Documents are available as related art documents:

A Combined Time and Frequency Algorithm for Improved Channel Estimation in TDS-OFDM, Liu, M.; Crussiere, M.; Helard, J.-F.; Communications (ICC), 2010 IEEE International Conference on;

Novel Synchronization for TDS-OFDM-Based Digital Television Terrestrial Broadcast System, Zi-Wei Zheng, Zhi-Xing Yang, Chang-Yong Pan, and Yi-Sheng Zhu, Senior Member, IEEE, IEEE TRANSACTIONS ON BROADCASTING, VOL. 50, NO. 2, JUNE 2004; and Error rotated decision feedback equalizer for Chinese DTTB Receiver, Dazhi He; Weigiang Liang; Wenjun Zhang; Ge Huang; Yunfeng Guan; Feng Ju; Broadband Multimedia Systems and Broadcasting, 2008 IEEE International Symposium on.

SUMMARY

A reception apparatus ready for the DTMB standard includes a module for carrying out various arithmetic operations using a signal in the time domain in order to receive data transmitted by single carrier transmission and another module for carrying out various arithmetic operations using a signal in the frequency domain in order to receive data transmitted by multicarrier transmission.

If the modules are prepared separately from each other, then the reception apparatus comes to have a correspondingly great circuit scale.

Therefore, it is desirable to provide a reception apparatus whose circuit scale can be suppressed while it is ready for both of data transmission in which a single carrier is used and data transmission in which multi carriers are used.

According to an embodiment of the disclosed technology, there is provided a reception apparatus including a first equalization section adapted to carry out equalization of a signal which represents data transmitted by a transmission method which uses a single carrier, a second equalization section adapted to carry out equalization of a signal which represents data transmitted by a transmission method which uses multi carriers, and an arithmetic operation section adapted to carry out arithmetic operation for determining information to be used for the equalization by the first equalization section and arithmetic operation for determining information to be used for the equalization by the second equalization section.

The arithmetic operation section may carry out the arithmetic operation for determining the information to be used for the equalization by the first equalization section using a signal in the time domain and carry out the arithmetic operation for determining the information to be used for the equalization by the second equalization section using a signal in the frequency domain.

The arithmetic operation section may use the signal in the time domain to carry out at least some of arithmetic operation for carrying out a hard decision of an equalized signal, arithmetic operation for determining an error between the equalized signal and a signal which represents a result of the hard decision and arithmetic operation for determining a filter coefficient to be used for the equalization based on the error and use the signal in the frequency domain to carry out some of the arithmetic operations.

According to another embodiment of the disclosed technology, there is provided a reception method including carrying out equalization of a signal which represents data transmitted by a transmission method which uses a single carrier using a first equalization section, carrying out equalization of a signal which represents data transmitted by a transmission method which uses multi carriers using a second equalization section, and carrying out arithmetic operation for determining information to be used for the equalization by the first equalization section and arithmetic operation for determining information to be used for the equalization by the second equalization section using an arithmetic operation section.

According to a further embodiment of the disclosed technology, there is provided a program for causing a computer to execute a process including carrying out equalization of a signal which represents data transmitted by a transmission method which uses a single carrier using a first equalization section, carrying out equalization of a signal which represents data transmitted by a transmission method which uses multi carriers using a second equalization section, and carrying out arithmetic operation for determining information to be used for the equalization by the first equalization section and arithmetic operation for determining information to be used for the equalization by the second equalization section using an arithmetic operation section.

In the reception apparatus, reception method and program, equalization of a signal representative of data transmitted by the transmission method which uses a single carrier is carried out by the first equalization section, and equalization of a signal representative of data transmitted by the transmission method which uses multi carries is carried out by the second equalization. Further, arithmetic operation for determining information to be used for the equalization by the first equalization section and arithmetic operation for determining information to be used for the equalization by the second equalization section are carried out by the arithmetic operation section.

With the reception apparatus, reception method and program, the circuit scale of the reception apparatus which is ready for both of the data transmission which uses a single carrier and the data transmission which uses multi carries can be suppressed.

The above and other features and advantages of the disclosed technology will become apparent from the following description and the appended claims, taken in conjunction with the accompanying drawings in which like parts or elements denoted by like reference characters.

DETAILED DESCRIPTION OF THE PREFERRED EMBODIMENTS

Example of the Configuration of the Reception Apparatus

Figure 3:
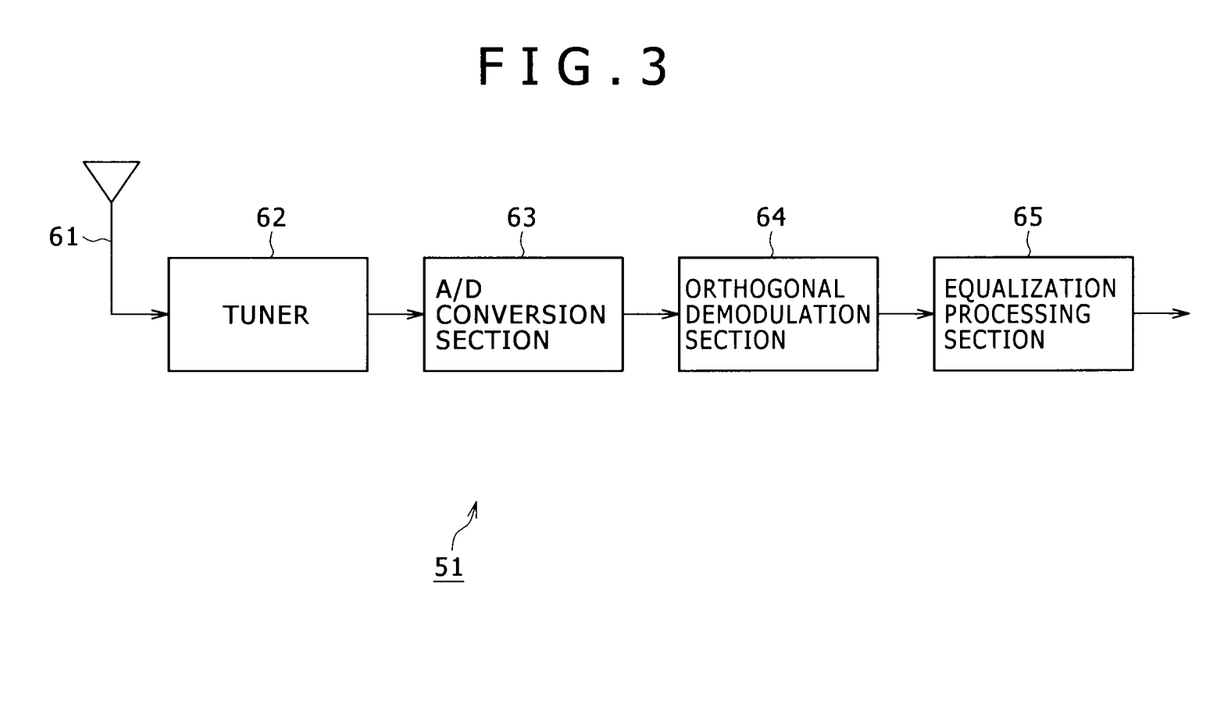
FIG. 3 is a block diagram showing an example of a configuration of a reception apparatus to which the disclosed technology is applied.

FIG. 3 shows an example of a configuration of a reception apparatus to which the disclosed technology is applied.

Referring to FIG. 3, the reception apparatus 51 shown includes an antenna 61, a tuner 62, an A/D (Analog/Digital) conversion section 63, an orthogonal demodulation section 64, and an equalization processing section 65. The reception apparatus 51 is ready, for example, for the DTMB standard for terrestrial digital broadcasting.

As described hereinabove, according to the DTMB standard, one of a modulation method which uses a single carrier and another modulation method which uses multi carriers can be selectively used as the modulation method for data. The reception apparatus 51 which is ready for the DTMB standard has a function for receiving data transmitted thereto by the modulation method which uses a single carrier and another function for receiving data transmitted thereto by the modulation method which uses multi carriers.

The tuner 62 receives a RF signal, carries out frequency conversion and outputs an IF signal obtained by the frequency conversion to the A/D conversion section 63.

The A/D conversion section 63 carries out A/D conversion for the signal supplied thereto from the tuner 62 and outputs resulting data.

The orthogonal demodulation section 64 carries out orthogonal demodulation for the data supplied thereto from the A/D conversion section 63 and outputs a signal of a baseband. In particular, the orthogonal demodulation section 64 outputs a signal in the time domain representative of data transmitted by single carrier transmission or a signal in the time domain representative of data transmission by multicarrier transmission.

The equalization processing section 65 carries out equalization of the signal supplied thereto from the orthogonal demodulation section 64. In particular, the equalization processing section 65 carries out equalization of both of a signal representative of data transmitted by single carrier transmission and another signal representative of data transmitted by multicarrier transmission. The equalization processing section 65 outputs an equalized signal to a circuit at a succeeding stage. In the circuit at the succeeding stage, processes such as error correction are carried out for data represented by the equalized signal produced by the equalization processing section 65.

Example of the Configuration of the Equalization Processing Section

Figure 4:
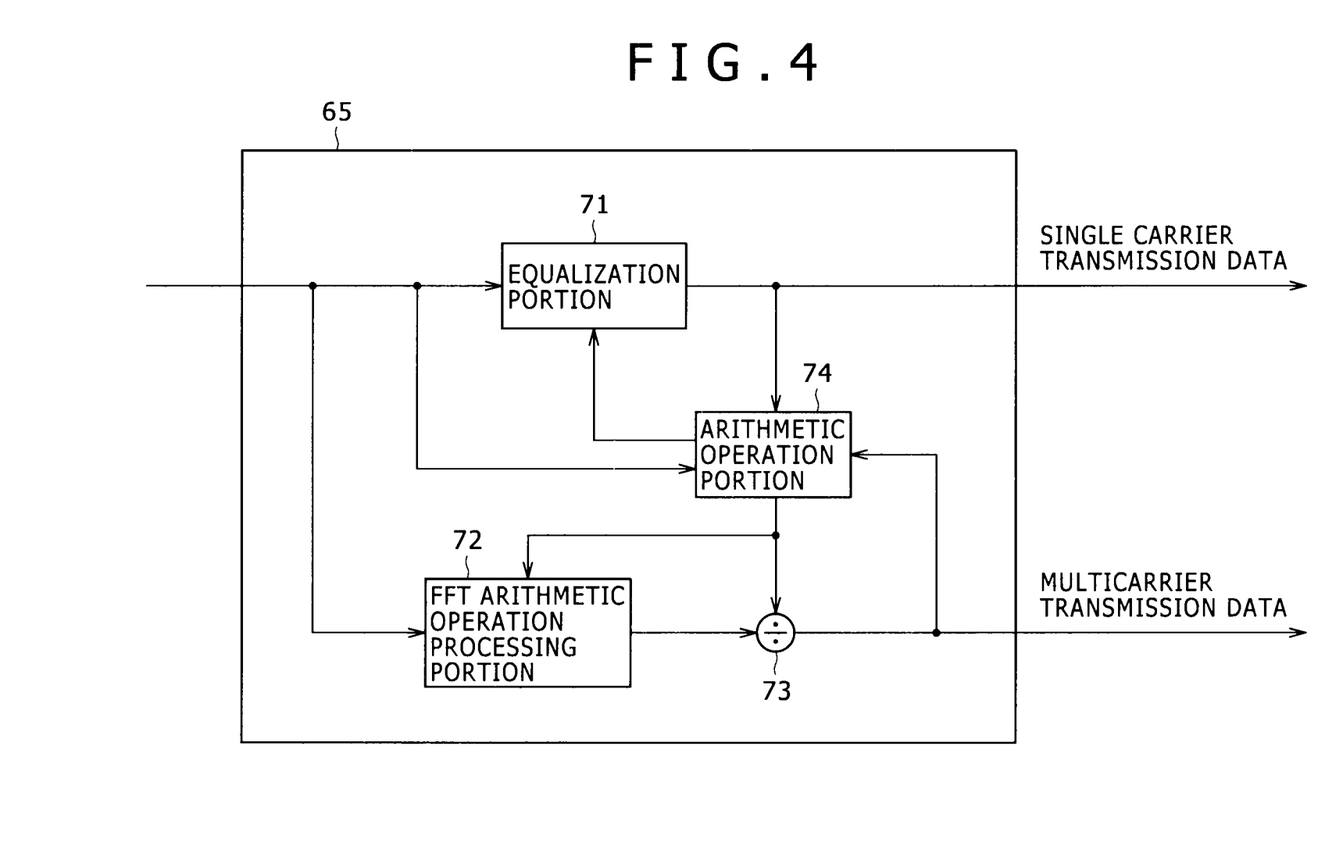
FIG. 4 is a block diagram showing an example of a configuration of an equalization processing section of the reception apparatus of FIG. 3.

FIG. 4 shows an example of a configuration of the equalization processing section 65.

Referring to FIG. 4, although a detailed configuration is hereinafter described, the equalization processing section 65 includes, as principal components thereof, an equalization portion 71, a FFT arithmetic operation processing portion 72, a division portion 73 and an arithmetic operation portion 74. A signal in the time domain outputted from the orthogonal demodulation section 64 is inputted to the equalization portion 71, FFT arithmetic operation processing portion 72 and arithmetic operation portion 74.

The equalization portion 71 carries out equalization of the input signal representative of data transmitted by single carrier transmission to produce an equalized signal and outputs the equalized signal. The equalized signal outputted from the equalization portion 71 is outputted as single carrier transmission data to the outside and is supplied also to the arithmetic operation portion 74.

The FFT arithmetic operation processing portion 72 carries out processes of removal of a PN signal, FFT arithmetic operation and so forth for the input signal representative of data transmitted by multicarrier transmission and outputs a resulting data signal to the division portion 73.

The division portion 73 uses a channel estimation value determined by the arithmetic operation portion 74 to remove distortion components included in the data signal supplied thereto from the FFT arithmetic operation processing portion 72 to produce an equalized signal and outputs the equalized signal. The equalized signal outputted from the division portion 73 is outputted as multicarrier transmission data to the outside and is supplied also to the arithmetic operation portion 74. The FFT arithmetic operation processing portion 72 and the division portion 73 function as the equalization section for carrying out equalization of an input signal representative of data transmitted by multicarrier transmission.

The arithmetic operation portion 74 carries out arithmetic operation for determining information to be used for equalization based on the input signal representative of data transmitted by single carrier transmission and an equalized signal supplied thereto from the equalization portion 71 using signals in the time domain. The arithmetic operation portion 74 outputs information determined by the arithmetic operation using signals in the time domain to the equalization portion 71. The equalization portion 71 carries out equalization of the input signal using the information determined by the arithmetic operation using signals in the time domain.

Further, the arithmetic operation portion 74 carries out arithmetic operation for determining information to be utilized for equalization based on an input signal representative of data transmitted by multicarrier transmission and an equalized signal supplied thereto from the division portion 73 using signals in the frequency domain. The arithmetic operation portion 74 outputs information determined by the arithmetic operation using signals in the frequency domain to the FFT arithmetic operation processing portion 72 and the division portion 73. The FFT arithmetic operation processing portion 72 and the division portion 73 use the information determined by the arithmetic operation using signals in the frequency domain to carry out equalization of the input signal.

In this manner, the single equalization processing section 65 commonly carries out arithmetic operation using signals in the time domain and arithmetic operation using signals in the frequency domain. Changeover of signals to be used for the process is carried out by respective selectors included in the arithmetic operation portion 74.

Figure 5:
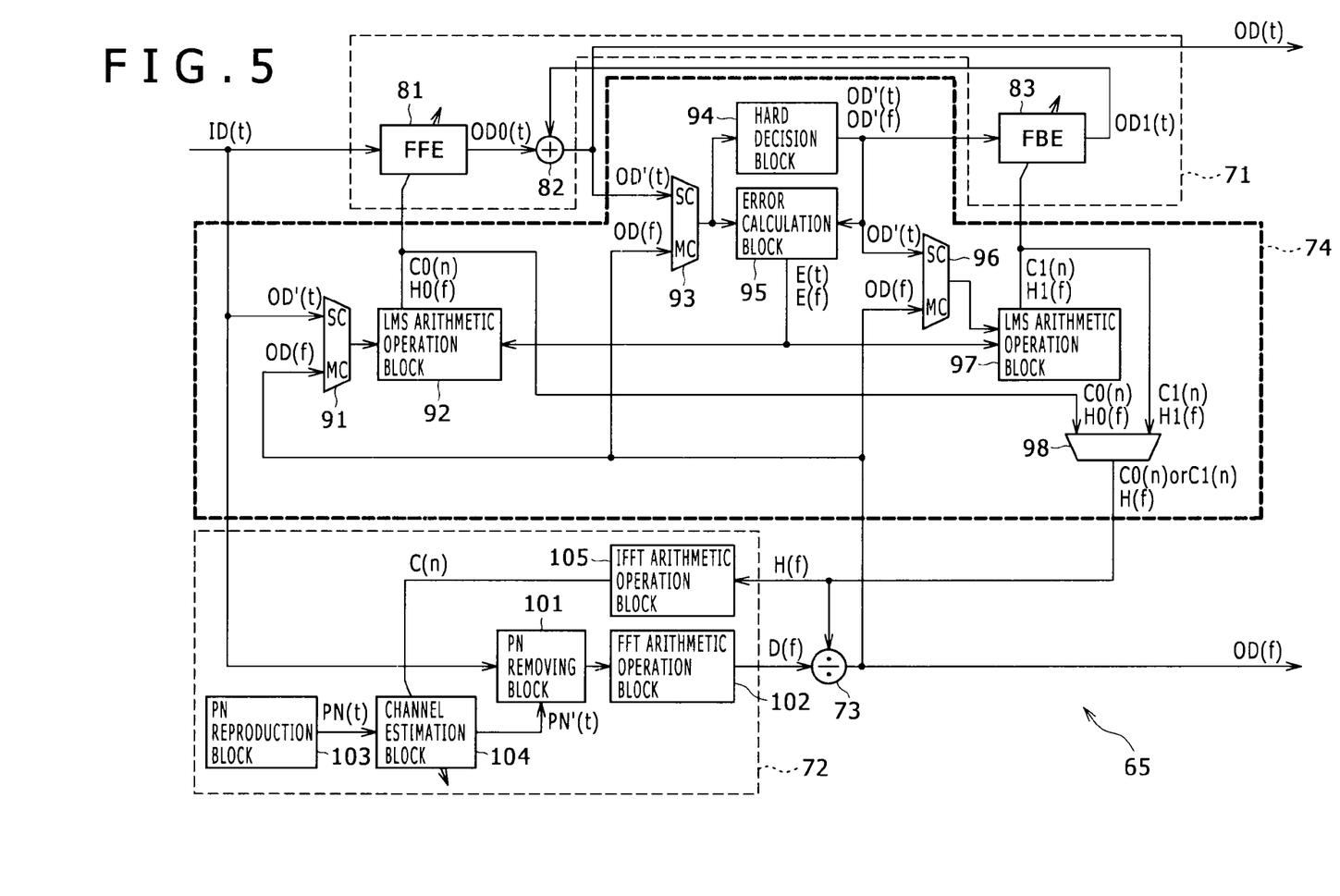
FIG. 5 is a block diagram showing an example of a detailed configuration of the equalization processing section of FIG. 4.

FIG. 5 shows an example of a detailed configuration of the equalization processing section 65.

Referring to FIG. 5, the equalization portion 71 includes a FFE 81, an addition block 82 and a FBE 83. The FFT arithmetic operation processing portion 72 includes a PN removing block 101, a FFT arithmetic operation block 102, a PN reproduction block 103, a channel estimation block 104, and an IFFT arithmetic operation block 105. The arithmetic operation portion 74 includes a LMS arithmetic operation block 92, a hard decision block 94, an error calculation block 95, a LMS arithmetic operation block 97, and selectors 91, 93, 96 and 98. An input signal ID(t) outputted from the orthogonal demodulation section 64 is inputted to the FFE 81 of the equalization portion 71, PN removing block 101 of the FFT arithmetic operation processing portion 72, and selector 91 of the arithmetic operation portion 74.

A configuration which carries out processing upon reception of data transmitted by single carrier transmission is described. Upon reception of data transmitted by single carrier transmission, processing is carried out by the components of the equalization portion 71 and the arithmetic operation portion 74.

Figure 6A:
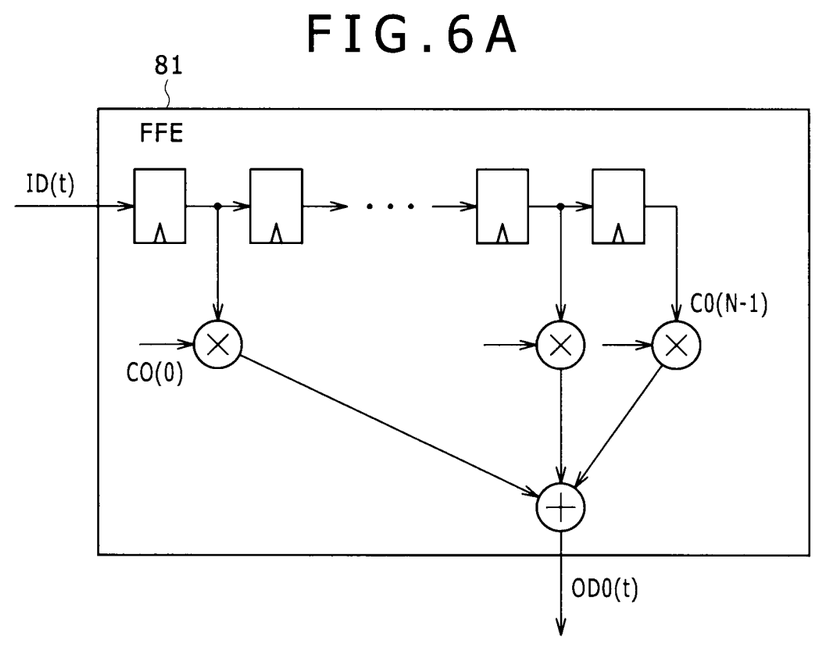
FIGS. 6A and 6B are diagrammatic views showing an example of a configuration of a FFE and a FBE shown in FIG. 5, respectively.

The FFE 81 is configured from such a variable coefficient filter having multiple taps as shown in FIG. 6A. The FFE 81 uses a coefficient $C0(n)$ determined by the LMS arithmetic operation block 92 to carry out convolution arithmetic operation of the input signal ID(t) and the coefficient $C0(n)$. The FFE 81 outputs a signal $OD0(t)$ representative of a result of the convolution arithmetic operation to the addition block 82. If the tap number of the FFE 81 is represented by N_FFE, then the output signal $OD0(t)$ of the FFE 81 is represented by the expression (1) given hereinabove.

The addition block 82 carries out addition of the output signal $OD0(t)$ of the FFE 81 and the output signal $OD1(t)$ of the FBE 83 to produce an equalized signal OD(t) (OD(t)= $OD0(t)+OD1(t)$) and outputs the equalized signal OD(t). The equalized signal OD(t) outputted from the addition block 82 is outputted to the outside of the equalization processing section 65 and is supplied also to the selector 93.

The selector 93 outputs the equalized signal OD(t) if the equalized signal OD(t) is supplied thereto from the addition block 82. The equalized signal OD(t) outputted from the selector 93 is supplied to the hard decision block 94 and the error calculation block 95.

The hard decision block 94 carries out a hard decision of the equalized signal OD(t) supplied thereto from the addition block 82 through the selector 93 and outputs a signal OD'(t) representative of a result of the hard decision. The signal OD'(t) is supplied to the FBE 83, error calculation block 95 and selector 96.

Figure 6B:
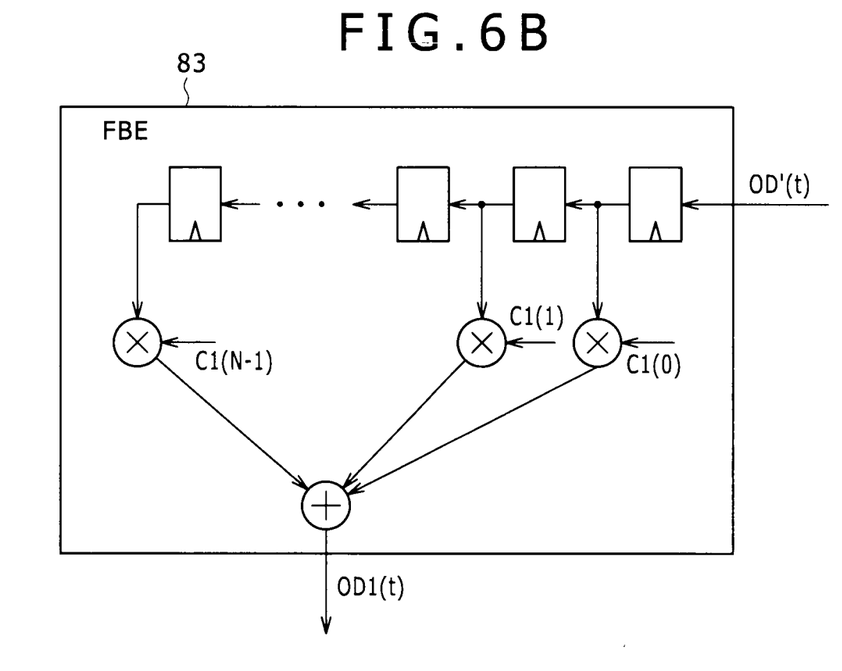

The FBE 83 is configured from such a variable coefficient filter having multiple taps as shown in FIG. 6B. Referring to FIG. 6B, the FBE 83 uses a coefficient $C1(n)$ determined by the LMS arithmetic operation block 97 to carry out convolution arithmetic operation of the signal OD'(t) supplied thereto from the hard decision block 94 and the coefficient $C1(n)$. The FBE 83 outputs a signal $OD1(t)$ representative of a result of the convolution arithmetic operation. The output signal OD1(t) is supplied to the addition block 82, by which it is used for addition to the output signal $OD0(t)$. If the tap number of the FBE 83 is represented by N_FBE, then the output signal $OD1(t)$ of the FBE 83 is represented by the expression (2) given hereinabove.

The error calculation block 95 subtracts the signal OD'(t) supplied thereto from the hard decision block 94 and representative of a result of the hard decision from the equalized signal OD(t) supplied thereto from the addition block 82 through the selector 93 and outputs an error signal E(t) (E(t)= OD(t)−OD'(t)). The error signal E(t) outputted from the error calculation block 95 is supplied to the LMS arithmetic operation block 92 and the LMS arithmetic operation block 97.

The selector 91 outputs, in the case where an input signal representative of data transmitted by single carrier transmission is supplied thereto, the input signal ID(t) to the LMS arithmetic operation block 92.

The LMS arithmetic operation block 92 carries out LMS arithmetic operation based on the input signal ID(t) supplied thereto from the selector 91 and the error signal E(t) supplied thereto from the error calculation block 95 to update the coefficient C0(n) of the FFE 81. The coefficient C0(n) determined by the LMS arithmetic operation block 92 is supplied to the FFE 81 and supplied also to the selector 98.

The selector 96 outputs, in the case where the signal OD'(t) representative of a result of the hard decision is supplied thereto from the hard decision block 94, the signal OD'(t) to the LMS arithmetic operation block 97.

The LMS arithmetic operation block 97 carries out LMS arithmetic operation based on the signal OD'(t) supplied thereto from the hard decision block 94 through the selector 96 and representative of a result of the hard decision and the error signal E(t) supplied thereto from the error calculation block 95 to update the coefficient C1(n) of the FBE 83. The coefficient C1(n) determined by the LMS arithmetic operation block 97 is supplied to the FBE 83 and supplied also to the selector 98.

In the case where the coefficient C0(n) is supplied from the LMS arithmetic operation block 92 and the coefficient C1(n) is supplied from the LMS arithmetic operation block 97, the selector 98 outputs the coefficients supplied thereto. Upon reception of data transmitted by single carrier transmission, the processing for the coefficient C0(n) or C1(n) outputted from the selector 98 is not carried out by the FFT arithmetic operation processing portion 72.

In this manner, upon reception of data transmitted by single carrier transmission, the arithmetic operation portion 74 carries out arithmetic operation for hard decision, arithmetic operation of an error signal and arithmetic operation for coefficient updating of the various coefficient filters, that is, the FFE 81 and the FBE 83, using signals in the time domain.

Now, a configuration for carrying out processing upon reception of data transmitted by multicarrier transmission is described. Upon reception of data transmitted by multicarrier transmission, processing is carried out by the FFT arithmetic operation processing portion 72, division portion 73 and arithmetic operation portion 74.

The PN removing block 101 subtracts an estimation value PN'(t) of a PN signal supplied thereto from the channel estimation block 104 from an input signal ID(t) to remove a PN signal from the input signal ID(t) and outputs a data signal (ID(t)−PN'(t)) to the FFT arithmetic operation block 102.

The FFT arithmetic operation block 102 carries out FFT arithmetic operation for the data signal supplied thereto from the PN removing block 101 and outputs a data signal D(f) to the division portion 73. The data signal D(f) is a signal in the frequency region.

The division portion 73 divides the data signal D(f) supplied thereto from the FFF arithmetic operation block 102 by a channel estimation value H(f) supplied thereto from the selector 98 to produce an equalized signal OD(f) and outputs the equalized signal OD(f). The equalized signal OD(f) outputted from the division portion 73 is outputted to the outside of the equalization processing section 65 and is supplied also to the selectors 91, 93 and 96.

The selector 93 outputs the equalized signal OD(f) in the case where the equalized signal OD(f) is supplied thereto from the division portion 73. The equalized signal OD(f) outputted from the selector 93 is supplied to the hard decision block 94 and the error calculation block 95.

The hard decision block 94 carries out a hard decision of the equalized signal OD(f) and outputs a signal OD'(f) representative of a result of the hard decision. The signal OD'(f) is supplied to the FBE 83, error calculation block 95 and selector 96. Upon reception of data transmitted by multicarrier transmission, the processing for the signal OD'(f) outputted from the hard decision block 94 is not carried out by the FBE 83.

The error calculation block 95 subtracts the signal OD'(f) supplied thereto from the hard decision block 94 from the equalized signal OD(f) supplied thereto from the division portion 73 through the selector 93 and outputs an error signal E(f) (E(f)=OD(f)−OD'(f)). The error signal E(f) outputted from the error calculation block 95 is supplied to the LMS arithmetic operation block 92 and the LMS arithmetic operation block 97.

The selector 91 outputs, in the case where the equalized signal OD(f) is supplied thereto from the division portion 73 upon reception of data by multicarrier transmission, the equalized signal OD(f) to the LMS arithmetic operation block 92.

The LMS arithmetic operation block 92 carries out LMS arithmetic operation based on the equalized signal OD(f) supplied thereto from the division portion 73 through the selector 91 and the error signal E(f) supplied thereto from the error calculation block 95 to determine a channel estimation value H0(f) in the frequency domain. The channel estimation value H0(f) determined by the LMS arithmetic operation block 92 is supplied to the FFE 81 and the selector 98. Upon reception of data transmitted by multicarrier transmission, the processing for the channel estimation value H0(f) outputted from the LMS arithmetic operation block 92 is not carried out by the FFE 81.

The selector 96 outputs, in the case where the equalized signal OD(f) is supplied thereto from the division portion 73 upon reception of data transmitted by multicarrier transmission, the equalized signal OD(f) to the LMS arithmetic operation block 97.

The LMS arithmetic operation block 97 carries out LMS arithmetic operation based on the equalized signal OD(f) supplied thereto from the division portion 73 through the selector 96 and the error signal E(f) supplied thereto from the error calculation block 95 to determine a channel estimation value H1(f) in the frequency domain. The channel estimation value H1(f) determined by the LMS arithmetic operation block 97 is supplied to the FBE 83 and the selector 98. Upon reception of data transmitted by multicarrier transmission, the processing for the channel estimation value H1(f) outputted from the LMS arithmetic operation block 97 is not carried out by the FBE 83.

The selector 98 selects, when the channel estimation value H0(f) determined by the LMS arithmetic operation block 92 and the channel estimation value H1(f) determined by the LMS arithmetic operation block 97 are supplied thereto, one of the channel estimation values and outputs the selected channel estimation value as a channel estimation value H(f). The channel estimation value H(f) outputted from the selector 98 is supplied to the division portion 73, by which it is used for equalization of the data signal D(f), and is supplied also to the IFFT arithmetic operation block 105.

The IFFT arithmetic operation block 105 carries out IFFT arithmetic operation for the channel estimation value H(f) supplied thereto from the selector 98 and outputs a channel estimation value C(n) in the time domain to the channel estimation block 104.

The channel estimation block 104 is configured from a variable coefficient filter having multiple taps for carrying out convolution arithmetic operation. The channel estimation block 104 uses the channel estimation value C(n) supplied thereto from the IFFT arithmetic operation block 105 as a coefficient to carry out convolution arithmetic operation of the PN signal reproduced by the PN reproduction block 103 and the channel estimation value C(n). The channel estimation block 104 outputs an estimation value PN'(t) of the PN signal determined by the convolution arithmetic operation to the PN removing block 101. If the PN signal reproduced by the PN reproduction block 102 is represented by PN(t) and the tap number of the filter which configures the channel estimation block 104 by N_CHE, then the estimation value PN'(t) of the PN signal is represented by the expression (3) given hereinabove.

The PN reproduction block 103 reproduces the PN signal PN(t) and outputs the PN signal PN(t) to the channel estimation block 104.

In this manner, upon reception of data transmitted by multicarrier transmission, the arithmetic operation portion 74 carries out arithmetic operation for hard decision, arithmetic operation of an error signal and arithmetic operation for coefficient updating of the coefficient filter, that is, the channel estimation block 104, using signals in the frequency domain.

Since arithmetic operation for receiving data transmitted by single carrier transmission and arithmetic operation for receiving data transmitted by multicarrier transmission are carried out using the arithmetic operation section commonly as described above, the circuit scale of the reception apparatus 51 can be suppressed.

Operation of the Equalization Processing Section 65

Figure 7:
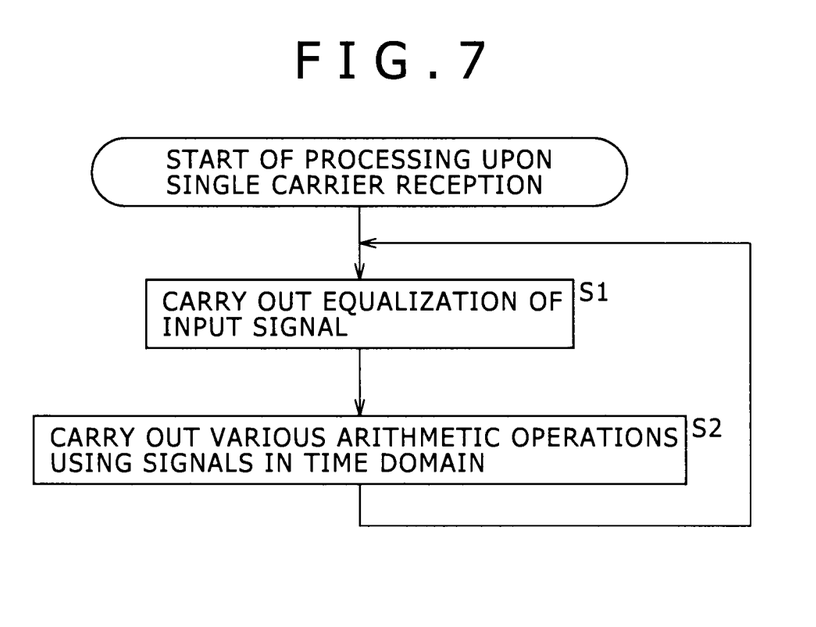
FIG. 7 is a flow chart illustrating a process of the reception apparatus of FIG. 2 upon reception of data transmitted thereto by single carrier transmission.
Figure 8:
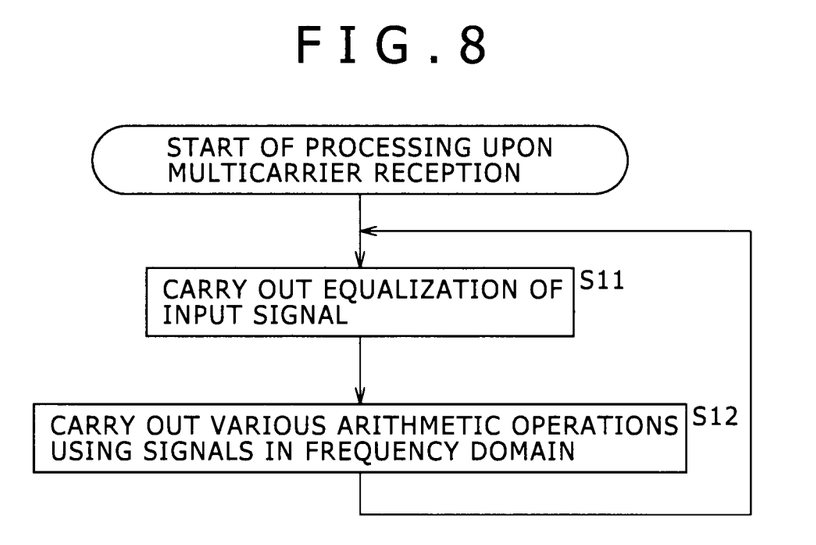
FIG. 8 is a flow chart illustrating a process of the reception apparatus of FIG. 2 upon reception of data transmitted thereto by multicarrier transmission.

Here, operation of the equalization processing section 65 is described with reference to flow charts of FIGS. 7 and 8. The processes at the steps shown in FIGS. 7 and 8 may be carried out in order as illustrated or may be carried out suitably in parallel to other processes or in a different order with respect to other processes.

First, a process upon reception of data transmitted by single carrier transmission is described with reference to FIG. 7.

At step S1, the equalization portion 71 carries out equalization of an input signal. In particular, the FFE 81 carries out convolution arithmetic operation of the input signal ID(t) and the coefficient C0(n) determined by the LMS arithmetic operation block 92, and the FBE 83 carries out convolution arithmetic operation of the signal OD'(t) and the coefficient C1(n) determined by the LMS arithmetic operation block 97. Further, the addition block 82 adds the output signal OD0(t) of the FFE 81 and the output signal OD1(t) of the FBE 83 to produce an equalized signal OD(t).

At step S2, the arithmetic operation portion 74 carries out various arithmetic operations using signals in the time domain. In particular, the selectors 91, 93, 96 and 98 select signals in the time domain, and the hard decision block 94 carries out a hard decision of the equalized signal OD(t). Further, the error calculation block 95 produces an error signal E(t) representative of a result of subtraction of the signal OD'(t) representative of a result of the hard decision from the equalized signal OD(t). The LMS arithmetic operation block 92 updates the coefficient C0(n) of the FFE 81 based on the input signal ID(t) and the error signal E(t), and the LMS arithmetic operation block 97 updates the coefficient C1(n) of the FBE 83 based on the signal OD'(t) representative of the result of the hard decision and the error signal E(t).

Thereafter, the processing returns to step S1, and the processes described above are repeated.

Now, a process upon reception of data transmitted by multicarrier transmission is described with reference to FIG. 8.

At step S11, the FFT arithmetic operation processing portion 72 and the division portion 73 carry out equalization of an input signal. In particular, the PN removing block 101 subtracts an estimation value PN'(t) of a PN signal from the input signal ID(t) to remove the PN signal, and the FFT arithmetic operation block 102 carries out FFT arithmetic operation for the data signal. Further, the division portion 73 divides the data signal D(f) which is a result of the FFT arithmetic operation by the channel estimation value H(f) to produce an equalized signal OD(f) and outputs the equalized signal OD(f). The IFFT arithmetic operation block 105 carries out IFFT arithmetic operation for the channel estimation value H(f), and the channel estimation block 104 carries out convolution arithmetic operation of the reproduced PN signal and the channel estimation value C(n).

At step S12, the arithmetic operation portion 74 carries out various arithmetic operations using signals in the frequency domain. In particular, the selectors 91, 93, 96 and 98 select signals in the frequency domain, and the hard decision block 94 carries out a hard decision of the equalized signal OD(f). Further, the error calculation block 95 produces an error signal E(f) representative of a result of subtraction of the signal OD'(f) representative of a result of the hard decision from the equalized signal OD(f). The LMS arithmetic operation block 92 produces a channel estimation value H0($f$) based on the equalized signal OD(f) and the error signal E(f), and the LMS arithmetic operation block 97 produces a channel estimation value H1($f$) based on the equalized signal OD(f) and the error signal E(f). One of the channel estimation values H0($f$) and H1($f$) is selected by the selector 98.

Thereafter, the processing returns to step S11, and the processes described above are repeated.

Examples of Application to a Reception System

Figure 9:
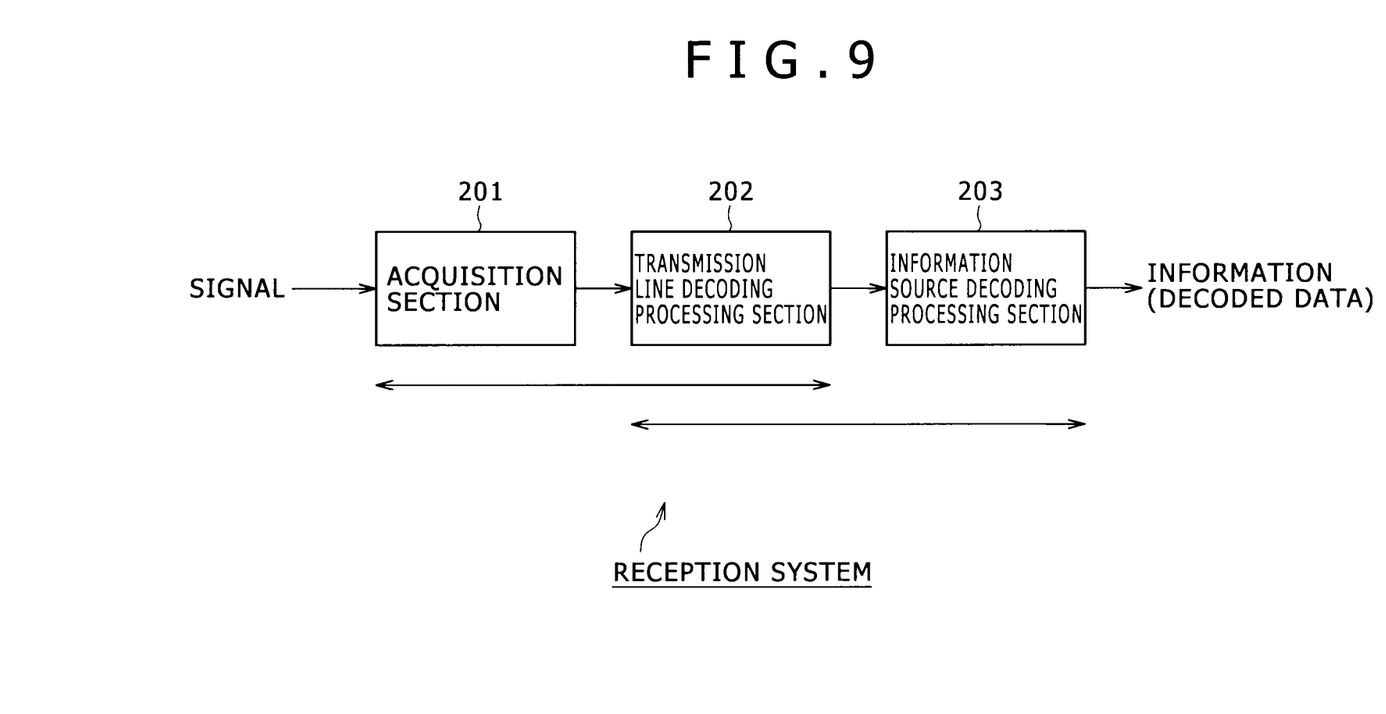
FIGS. 9, 10 and 11 are block diagrams showing different examples of a configuration a reception system.

FIG. 9 shows an example of a configuration of a first mode of a reception system to which the equalization processing section 65 is applied.

Referring to FIG. 9, the reception system shown includes an acquisition section 201, a transmission line decoding processing section 202, and an information source decoding processing section 203.

The acquisition section 201 acquires a signal through a transmission line not shown such as terrestrial digital broadcasting, satellite digital broadcasting, or a CATV network, the Internet or some other network and supplies the acquired signal to the transmission line decoding processing section 202. The equalization processing section 65 of FIG. 3 is included, for example, in the acquisition section 201.

The transmission line decoding processing section 202 carries out a transmission line decoding process including error correction for the signal acquired by the acquisition section 201 through the transmission line and supplies a resulting signal to the information source decoding processing section 203.

The information source decoding processing section 203 carries out an information source decoding process including a process of decompressing compressed information of the signal, for which the transmission line decoding process has been carried out, into original information to acquire data of a transmission object.

In particular, the signal acquired by the acquisition section 201 through the transmission line is sometimes in a compression coded form in which the information is compressed in order to reduce the data amount of an image, sound and so forth. In this instance, the information source decoding processing section 203 carries out, for the signal for which the transmission line decoding process has been carried out, the information source decoding process including a process for decompressing compressed information into original information.

It is to be noted that, if the signal acquired by the acquisition section 201 through the transmission line is not in a compression coded form, the information source decoding processing section 203 does not carry out the process of decompressing compressed information into original information. Here, the decompression process may be, for example, MPEG decoding. Further, the information source decoding process may include descrambling and so forth in addition to the decompression process.

The reception system of FIG. 9 can be applied, for example, to a television tuner for receiving a digital television broadcast. It is to be noted that each of the acquisition section 201, transmission line decoding processing section 202 and information source decoding processing section 203 can be configured as a single independent apparatus or hardware apparatus such as an IC (Integrated Circuit) or a software module.

The acquisition section 201, transmission line decoding processing section 202 and information source decoding processing section 203 may otherwise be configured as a single independent apparatus. Also it is possible to configure the acquisition section 201 and the transmission line decoding processing section 202 as a single independent apparatus or configure the transmission line decoding processing section 202 and the information source decoding processing section 203 as a single independent apparatus.

Figure 10:
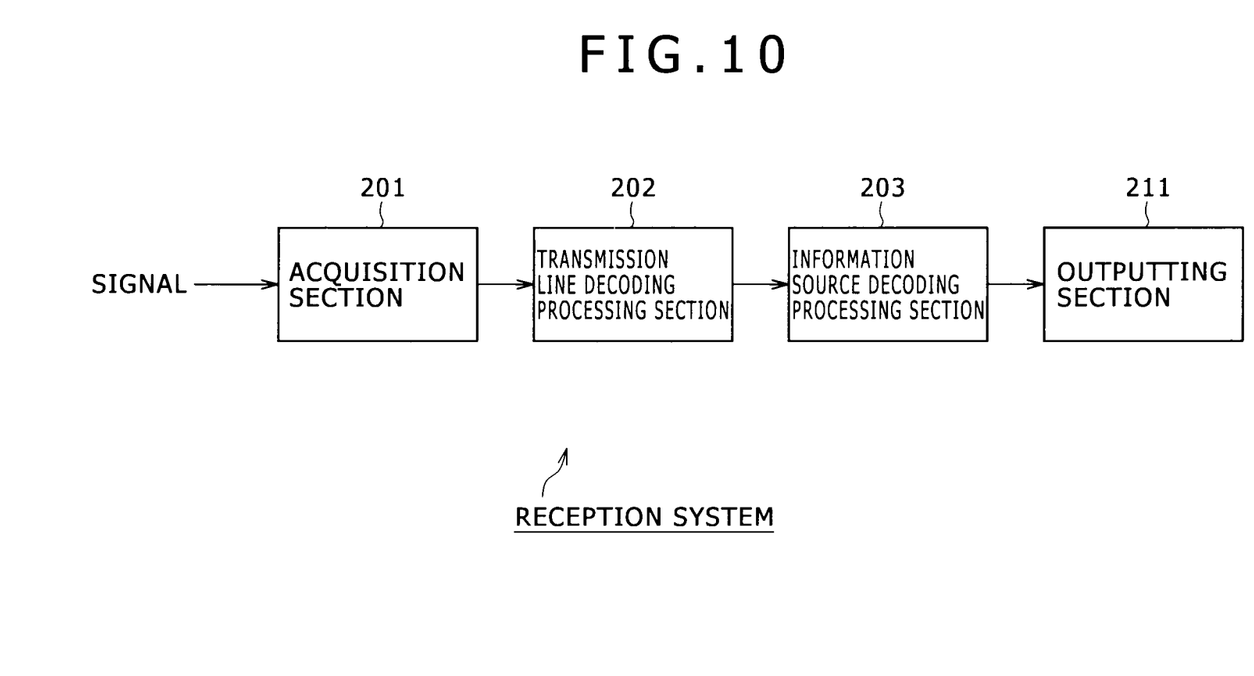

FIG. 10 shows an example of a configuration of a second mode of a reception system to which the equalization processing section 65 is applied.

The configuration of the reception system of FIG. 10 is common to the configuration of the reception system of FIG. 9 in that it includes an acquisition section 201, a transmission line decoding processing section 202 and an information source decoding processing section 203, but is different in that it additionally includes an outputting section 211.

The outputting section 211 is, for example, a display apparatus for displaying an image and/or a speaker for outputting sound, and outputs an image, sound or the like as a signal outputted from the information source decoding processing section 203. In other words, the outputting section 211 displays an image or outputs sound.

The reception system of FIG. 10 can be applied, for example, to a television set which receives a television broadcast as a digital broadcast, a radio receiver which receives a radio broadcast, and so forth.

It is to be noted that, if the signal acquired by the acquisition section 201 is not in a compression coded form, a signal outputted from the transmission line decoding processing section 202 is supplied directly to the outputting section 211.

Figure 11:
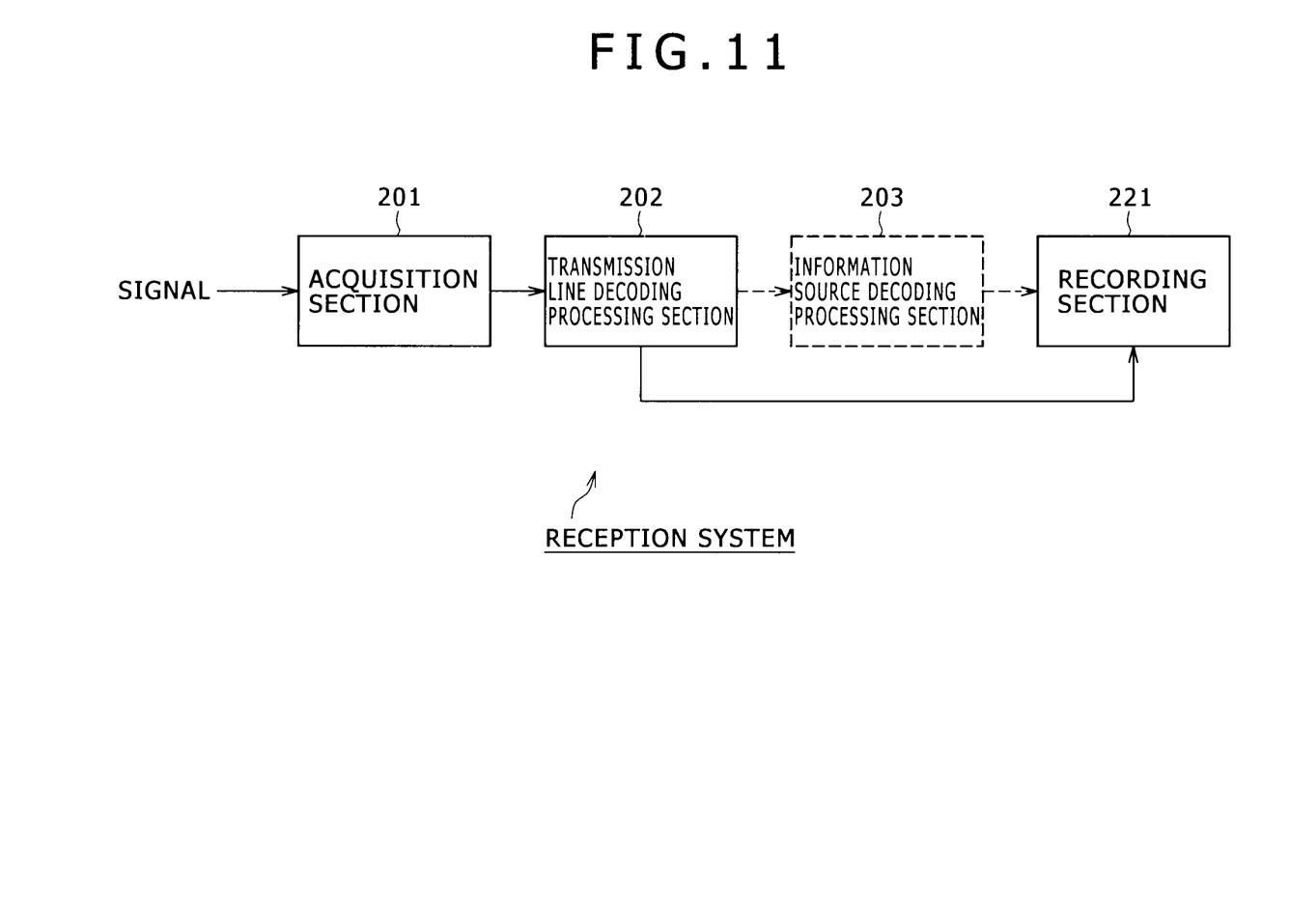

FIG. 11 shows an example of a configuration of a third mode of a reception system to which the equalization processing section 65 is applied.

The configuration of the reception system of FIG. 11 is common to the configuration of the reception system of FIG. 9 in that it includes an acquisition section 201 and a transmission line decoding processing section 202, but is different in that it does not include the information source decoding processing section 203 but includes an recording section 221 instead.

The recording section 221 records or stores a signal outputted from the transmission line decoding processing section 202 such as, for example, TS packets of a TS of the MPEG, on or into a recording or storage medium such as an optical disk, a hard disk or magnetic disk, or a flash memory.

The reception system of FIG. 11 having such a configuration as described above can be applied to a recorder apparatus for recording a television broadcast and so forth.

It is to be noted that the reception system of FIG. ?11 may include the information source decoding processing section 203 such that a signal after an information source decoding process is carried out by the information source decoding processing section 203, that is, an image or sound obtained by decoding, is recorded by the recording section 221.

Example of the Configuration of a Computer

While the series of processes described above can be executed by hardware, it may otherwise be executed by software. In the case where the series of processes is executed by software, a program which constructs the software is installed from a program recording medium into a computer incorporated in hardware for exclusive use, a personal computer for universal use, and so forth.

Figure 12:
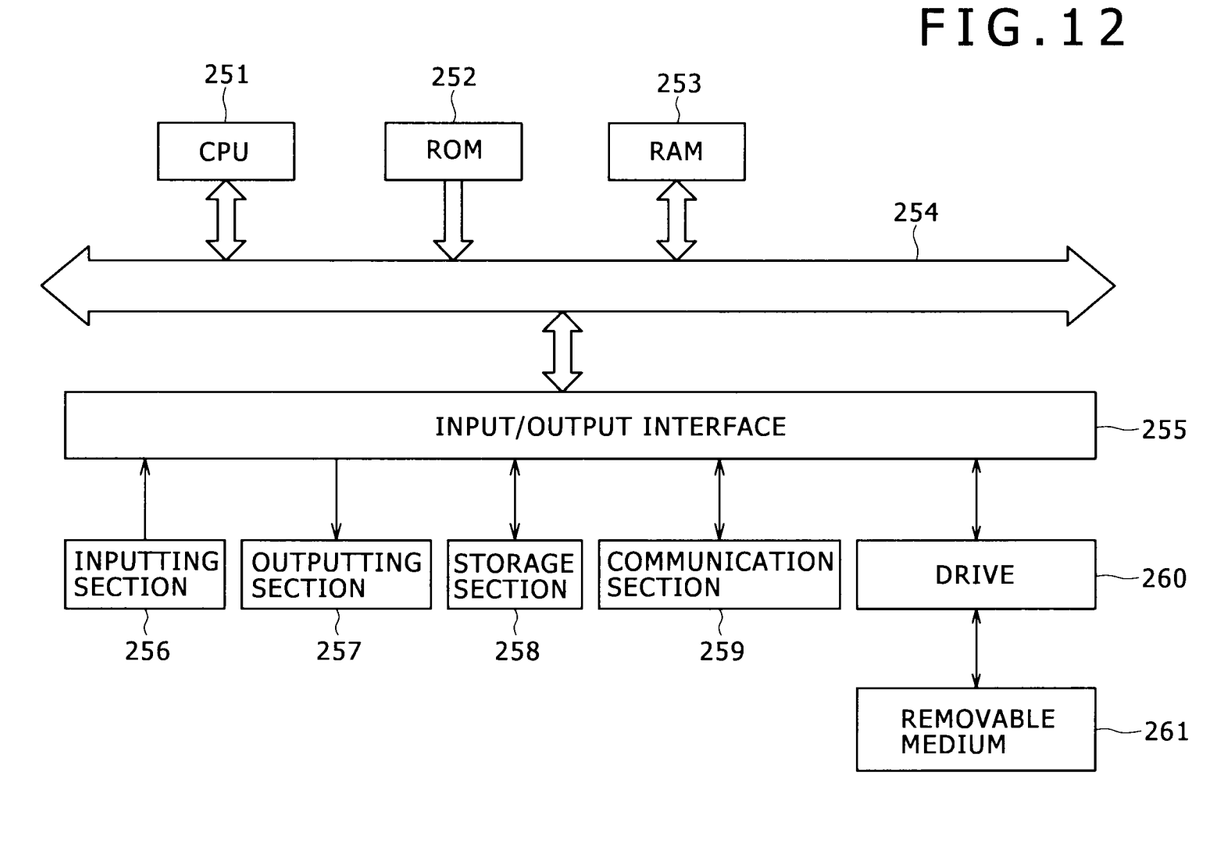
FIG. 12 is a block diagram showing an example of a configuration of a computer.

FIG. 12 shows an example of a hardware configuration of a computer which executes the series of processes described hereinabove in accordance with a program.

Referring to FIG. 12, in the computer shown, a central processing unit (CPU) 251, a read only memory (ROM) 252 and a random access memory (RAM) 253 are connected to one another by a bus 254.

Further, an input/output interface 255 is connected to the bus 254. An inputting section 256 including a keyboard, a mouse and so forth, and an outputting section 257 including a display unit, a speaker and so forth are connected to the input/output interface 255. Also, a storage section 258 formed from a hard disk, an nonvolatile memory, or the like, a communication section 259 formed from a network interface or the like, and a drive 260 for driving a removable medium 261 are connected to the input/output interface 255.

In the computer configured in such a manner as described above, the CPU 251 loads a program stored, for example, in the storage section 258 into the RAM 253 through the input/output interface 255 and the bus 254 and executes the program to carry out the series of processes described above.

The program to be executed by the CPU 251 can be recorded on, for example, a removable medium 261 or can be provided through a wire or wireless transmission medium such as a local area network, the Internet or a digital broadcast, and installed into the storage section 258.

It is to be noted that the program to be executed by the computer may be of the type by which the processes are carried out in a time series in the order as described in the present specification or of the type by which the processes are executed in parallel or executed individually at necessary timings such as when the process is called.

While preferred embodiments of the disclosed technology have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2010-235386 filed in the Japan Patent Office on Oct. 20, 2010, the entire content of which is hereby incorporated by reference.

What is claimed is:

1. A reception apparatus, comprising:
circuitry including:
a first equalization section adapted to carry out a first equalization of a first signal which represents data transmitted by a transmission method which uses a single carrier;
a second equalization section adapted to carry out a second equalization of a second signal which represents data transmitted by a transmission method which uses multi carriers; and an arithmetic operation section adapted to:
carry out, when the first signal is received by the circuitry, a first arithmetic operation for determining first information to be used for the first equalization using a signal in the time domain of the first signal, and output the first information to the first equalization section, and
carry out, when the second signal is received by the circuitry, a second arithmetic operation for determining second information to be used for the second equalization using a signal in the frequency domain of the second signal, and output the second information to the second equalization section, wherein
the first equalization section carries out the first equalization based on the first information, and
the second equalization section carries out the second equalization based on the second information.

2. The reception apparatus according to claim 1, wherein said arithmetic operation section uses the signal in the time domain to carry out at least some of a third arithmetic operation for carrying out a hard decision of a first equalized signal equalized by the first equalization section, a fourth arithmetic operation for determining an error between the first equalized signal and a signal which represents a result of the hard decision, and a fifth arithmetic operation for determining a first filter coefficient to be used for the first equalization based on the error, and
said arithmetic operation section uses the signal in the frequency domain to carry out at least some of a sixth arithmetic operation for carrying out a hard decision of a second equalized signal, a seventh arithmetic operation for determining an error between the second equalized signal and a signal which represents a result of the hard decision, and an eighth arithmetic operation for determining a second filter coefficient to be used for the second equalization based on the error.

3. The reception apparatus according to claim 1, wherein the first signal and the second signal are transmitted based on DTMB (Digital Terrestrial Multimedia Broadcast) standard.

4. The reception apparatus according to claim 1, wherein said arithmetic operation section uses the signal in the time domain to carry out a third arithmetic operation for carrying out a hard decision of a first equalized signal equalized by the first equalization section, and
said arithmetic operation section uses the signal in the frequency domain to carry out a sixth arithmetic operation for carrying out a hard decision of a second equalized signal.

5. The reception apparatus according to claim 1, wherein said arithmetic operation section uses the signal in the time domain to carry out a fourth arithmetic operation for determining an error between the first equalized signal and a signal which represents a result of the hard decision, and
said arithmetic operation section uses the signal in the frequency domain to carry out a seventh arithmetic operation for determining an error between the second equalized signal and a signal which represents a result of the hard decision.

6. The reception apparatus according to claim 1, wherein said arithmetic operation section uses the signal in the time domain to carry out a fifth arithmetic operation for determining a first filter coefficient to be used for the first equalization based on the error, and
said arithmetic operation section uses the signal in the frequency domain to carry out an eighth arithmetic operation for determining a second filter coefficient to be used for the second equalization based on the error.

7. The reception apparatus according to claim 1, wherein the a second equalization section includes a FFT (Fast Fourier Transform) arithmetic operation section that carries out a FFT (Fast Fourier Transform) arithmetic operation for the second signal.

8. A reception method, comprising:
carrying out, using a first equalization section included in circuitry, a first equalization of a first signal which represents data transmitted by a transmission method which uses a single carrier;
carrying out, using a second equalization section included in the circuitry, a second equalization of a second signal which represents data transmitted by a transmission method which uses multi carriers; and
carrying out, using an arithmetic operation section included in the circuitry, when the first signal is received by the circuitry, a first arithmetic operation for determining first information to be used for the first equalization using a signal in the time domain of the first signal, and outputting the first information to the first equalization section, and
carrying out, using the arithmetic operation section included in the circuitry, when the second signal is received by the circuitry, a second arithmetic operation for determining second information to be used for the second equalization using a signal in the frequency domain of the second signal, and outputting the second information to the second equalization section, wherein
the first equalization section carries out the first equalization based on the first information, and
the second equalization section carries out the second equalization based on the second information.

9. A non-transitory computer readable medium including executable instructions, which when executed by a computer cause the computer to execute a reception method, the method comprising:
carrying out, using a first equalization section included in circuitry, a first equalization of a first signal which represents data transmitted by a transmission method which uses a single carrier;
carrying out, using a second equalization section included in the circuitry, a second equalization of a second signal which represents data transmitted by a transmission method which uses multi carriers; and
carrying out, using an arithmetic operation section included in the circuitry, when the first signal is received by the circuitry, a first arithmetic operation for determining first information to be used for the first equalization using a signal in the time domain of the first signal, and outputting the first information to the first equalization section, and
carrying out, using the arithmetic operation section included in the circuitry, when the second signal is received by the circuitry, a second arithmetic operation for determining second information to be used for the second equalization using a signal in the frequency domain of the second signal, and outputting the second information to the second equalization section, wherein
the first equalization section carries out the first equalization based on the first information, and
the second equalization section carries out the second equalization based on the second information.

* * * * *